US012732733B2

(12) United States Patent

Liu et al.

(10) Patent No.: US 12,732,733 B2

(45) Date of Patent: Sep. 8, 2026

(54) METHOD AND SYSTEM OF STATIC CHARGE VARIATION SENSING BASED HUMAN JAW MOTION DETECTION FOR USER VOICE

(71) Applicant: Google LLC, Mountain View, CA (US)

(72) Inventors: Fang Liu, Palo Alto, CA (US); Trausti Thormundsson, Irvine, CA (US); Yuan Jen Chang, Mountain View, CA (US); Nicholas Jordan Sanders, Saratoga, CA (US); Kari Antero Pulli, Belmont, CA (US); Kuan-Lin Chen, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 64 days.

(21) Appl. No.: 18/712,527

(22) PCT Filed: Dec. 14, 2021

(86) PCT No.: PCT/US2021/063252

§ 371 (c)(1),
(2) Date: May 22, 2024

(87) PCT Pub. No.: WO2023/113775

PCT Pub. Date: Jun. 22, 2023

(65) Prior Publication Data

US 2025/0008252 A1 Jan. 2, 2025

(51) Int. Cl.

| | |
|---|---|
| ***H04R 1/10*** | (2026.01) |
| ***G10K 11/178*** | (2006.01) |
| ***H04R 1/1025*** | (2026.01) |

(52) U.S. Cl.

CPC ..... *H04R 1/1041* (2013.01); *G10K 11/17821* (2018.01); *H04R 1/1025* (2013.01); *H04R 1/1083* (2013.01)

(58) Field of Classification Search

CPC .... H04R 1/1016; H04R 1/105; H04R 1/1041; H04R 1/1025; H04R 1/1083

(Continued)

(56) References Cited

U.S. PATENT DOCUMENTS 11,540,743 B2 * 1/2023 Tan ...................... A61B 5/6815
12,181,689 B2 * 12/2024 Furukawa ............. G02F 1/1335

(Continued)

FOREIGN PATENT DOCUMENTS

JP 2007104670 A 4/2007
WO WO-2022047765 A1 * 3/2022 ............... H01Q 1/44
WO 2023113775 6/2023

OTHER PUBLICATIONS

"International Preliminary Report on Patentability", Application No. PCT/US2021/063252, Jun. 13, 2024, 10 pages.

(Continued)

*Primary Examiner* — Disler Paul

(74) *Attorney, Agent, or Firm* — Colby Nipper PLLC

(57) ABSTRACT

The present disclosure provides a system and method using a charge collection antenna in a wearable device to collect charge variation based on a user's jawbone and muscle motion. The collected charge variation may be used to determine an on-body status of the wearable device. For example, in wireless earbuds, information acquired from a charge collection antenna may be used to determine whether the earbud is worn in-ear by the user. The collected charge variation may also be used to detect jaw motion by the user.

20 Claims, 11 Drawing Sheets

(58) Field of Classification Search
USPC .............................................................. 381/74
See application file for complete search history.

(56) References Cited

U.S. PATENT DOCUMENTS

| | | | | |
|---|---|---|---|---|
| 12,191,689 | B2 * | 1/2025 | Hatanaka | H02J 7/0044 |
| 12,268,523 | B2 * | 4/2025 | Goldstein | A61B 5/6817 |
| 2020/0314527 | A1 | 10/2020 | Guo et al. | |
| 2020/0396530 | A1 | 12/2020 | Ding et al. | |

OTHER PUBLICATIONS

"International Search Report and Written Opinion", PCT Application No. PCT/US2021/063252, Aug. 16, 2022, 15 pages.
"Foreign Office Action", JP Application No. 2024-534056, Aug. 5, 2025, 23 pages.
"Foreign Office Action", IN Application No. 202447038897, Apr. 16, 2026, 8 pages.
"Foreign Office Action", EP Application No. 21840749.2, May 13, 2026, 8 pages.
Matthies, et al., "EarFieldSensing: A Novel In-Ear Electric Field Sensing to Enrich Wearable Gesture Input through Facial Expressions", May 2017, 12 pages.

* cited by examiner

METHOD AND SYSTEM OF STATIC CHARGE VARIATION SENSING BASED HUMAN JAW MOTION DETECTION FOR USER VOICE

RELATED APPLICATION(S)

This application is a national stage entry of International Application No. PCT/US2021/063252, filed Dec. 14, 2021, the disclosure of which is incorporated herein by reference in its entirety.

BACKGROUND

Wireless accessories, such as earbuds, are becoming increasingly smaller. For example, earbuds are being designed with a smaller form factor to be more comfortable to fit in a user's ear. The small form factor makes it increasingly challenging to get robust user voice detection based on bone vibration detection using an accelerometer, which requires a high bandwidth accelerometer mounted close to the ear canal bones to get the vibration signal.

Many conventional in-ear detection mechanisms cannot differentiate between the wireless accessory contacting a live human and the accessory contacting inanimate objects, making the in-ear detection very difficult in many cases.

Additionally, voice detection using conventional mechanisms may be inaccurate. For example, voice detection from bone vibration using an accelerometer may have noise from ambient sound, making the user voice detection inaccurate.

BRIEF SUMMARY

The present disclosure provides a system and method using a charge collection antenna in a wearable device to collect charge variation based on a user's jawbone and muscle motion. The collected charge variation may be used to determine an on-body status of the wearable device. For example, in wireless earbuds, information acquired from a charge collection antenna may be used to determine whether the earbud is worn in-ear by the user. The collected charge variation may also be used to detect jaw motion by the user.

Algorithms for in-ear and jaw motion detection are described. For example, the in-ear detection can be detected by a variance threshold algorithm and the jaw bone/muscle motion can be detected by peak signal detection. Such algorithms provide for conservation of system power, as the device can switch to operation in a low power mode when it is determined that the device is not being worn or that the device is not receiving voice input.

One aspect of the disclosure provides a method for determining a state of a wearable electronic device using one or more metal components of the wearable electronic device as an antenna. The method may comprise receiving, by the one or more metal components of the wearable electronic device, charge variation data, determining, by one or more processors, whether the received charge variation data exceeds a predetermined threshold, determining, by the one or more processors, that the wearable electronic device is being worn by a user when the received charge variation data exceeds the predetermined threshold, and operating the wearable electronic device in an active mode when it is determined that the wearable electronic device is being worn by the user. According to some examples, the method may further comprise processing the received charge variation data, wherein the determining whether the received charge variation data exceeds the predetermined threshold comprises comparing the processed charge variation data to the threshold. The processing of the received charge variation data may comprise at least one of amplifying the data or filtering the data.

According to some examples, the method may further comprise detecting, with the one or more processors, peaks in the received charge variation data when the device is determined to be worn by the user. The method may further comprise determining, with the one or more processors based on the detected peaks, whether the user's jaw is moving. The method may even further comprise operating the wearable electronic device in a listening mode when it is determined that the user's jaw is moving. I the listening mode, the wearable electronic device may perform at least one of audio noise cancellation or listening for voice input from the user.

According to some examples, the method further comprises determining, with the one or more processors, whether the wearable electronic device is connected to a charger, operating the wearable electronic device in a standby mode when the wearable electronic device is not connected to a charger, the standby mode being a low power mode, and operating the wearable electronic device in a charging mode when the wearable electronic device is connected to the charger, wherein in the charging mode the wearable electronic device receives charge through a charging pad of the wearable electronic device. The charging pad may function as the antenna when the wearable electronic device is not connected to the charger.

Another aspect of the disclosure provides a wearable electronic device, comprising a housing, one or more metal components integrated with, housed by, or coupled to the housing, the one or more metal components configured to function as one or more antennas, one or more processors in communication with the one or more metal components. The one or more processors may be configured to receive charge variation data from the one or more antennas, determine whether the received charge variation data exceeds a predetermined threshold, determine that the wearable electronic device is being worn by a user when the received charge variation data exceeds the predetermined threshold, and operate the wearable electronic device in an active mode when it is determined that the wearable electronic device is being worn by the user.

According to some examples, the wearable electronic device may further comprise circuitry in communication with the one or more antennas, the circuitry configured for processing the received charge variation data. The circuitry may comprise at least one of an amplifier, filter, or digital signal processor. The one or more processors may be further configured to detect peaks in the received charge variation data when the device is determined to be worn by the user.

According to some examples, the one or more processors may be further configured to determine whether the user's jaw is moving based on the detected peaks. The wearable electronic device may operate in a listening mode when it is determined that the user's jaw is moving. In the listening mode the wearable electronic device may perform at least one of audio noise cancellation or listening for voice input from the user.

According to some examples, at least one of the metal components may comprise a charging pad. The one or more processors may be further configured to determine whether the wearable electronic device is connected to a charger, operate the wearable electronic device in a standby mode when the wearable electronic device is not connected to a charger, the standby mode being a low power mode, and operate the wearable electronic device in a charging mode when the wearable electronic device is connected to the charger, wherein in the charging mode the wearable electronic device receives charge through the charging pad of the wearable electronic device. The charging pad may function as the antenna when the wearable electronic device is not connected to the charger.

According to some examples, the wearable electronic device is an earbud.

Yet another aspect of the disclosure provides a non-transitory computer-readable medium storing instructions executable by one or more processors for performing a method of determining a state of a wearable electronic device using one or more metal components of the wearable electronic device as an antenna. The method may comprise receiving charge variation data, determining whether the received charge variation data exceeds a predetermined threshold, determining that the wearable electronic device is being worn by a user when the received charge variation data exceeds the predetermined threshold, and operating the wearable electronic device in an active mode when it is determined that the wearable electronic device is being worn by the user.

DETAILED DESCRIPTION

Figure 1A:
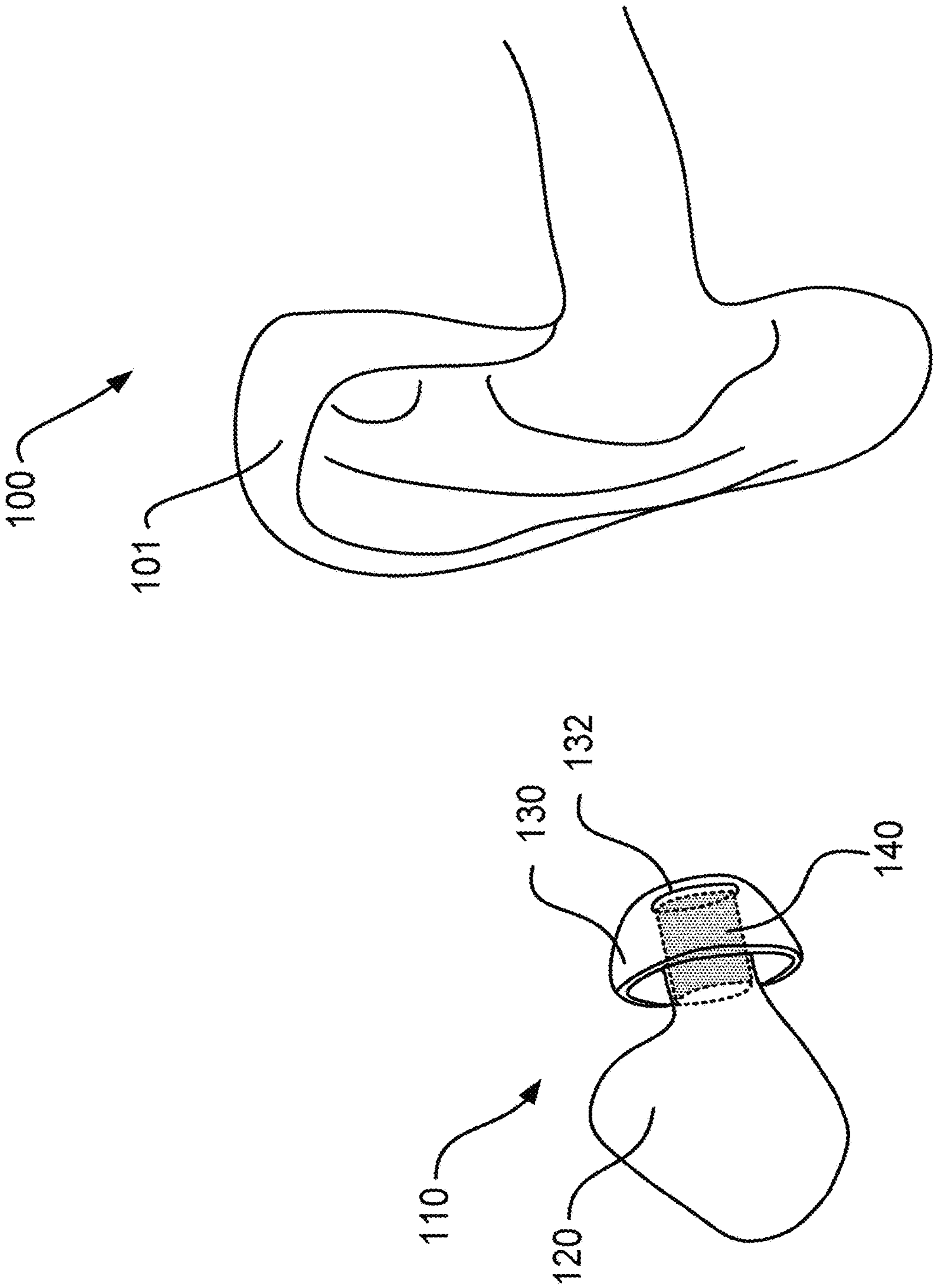
FIGS. 1A and 1B are pictorial diagrams illustrating example earbud placements in accordance with aspects of the disclosure.

The technology generally relates to on-body detection for a wearable electronic device. For example, earbuds may be configured to provide enriched user experience based on whether the earbuds are being worn by the user. For instance, when the earbuds are being worn in ear, as opposed to being held in a person's hand or placed in a charging case, pocket, or other container, audio may be routed to speakers in the earbuds instead of a speaker in another device, such as a paired phone. As another example, if a call comes in when the earbuds are not being worn, audio may be routed to a speaker in another device, such as the paired phone. Further, to conserve battery power and battery life, the earbuds may enter a standby mode when not being worn.

Accurately detecting whether earbuds are properly worn may prevent issues that arise from inaccurate detection. For instance, inaccurate detection of the earbuds being worn may cause audio to be routed incorrectly, which may result in inconvenience to the user and others. For example, routing music to a speaker in a paired phone in a quiet library or a crowded street, instead of the earbuds in the user's ears, may cause inconvenience to the user and others. Inaccurate detection of the earbuds being worn may also cause the earbuds to remain in active modes at unnecessary times, which may result in a wasteful use of battery power and a reduced battery life. In this regard, a wireless electronic device is provided with capabilities to detect whether the device being worn.

According to some examples, the electronic device is an earbud. The earbud may include a housing and a one or more antennas attached to, integrated with, or contained within the housing. By way of example, a metal snout of the device and/or charging pad contacts of the device may be configured to also function as an antenna for detecting charge variation. The earbud may further include one or more processors configured to measure the charge variation and determine a state of the earbud based on the measured charge variation. For example, the earbud may transition between an active mode, listening mode, standby mode, charging mode, or other mode based on charge variance information collected by the one or more antennas.

Moreover, the processors may further detect whether the user wearing the earbuds is talking. For example, the processors may detect whether the user's jaw is moving based on charge variance collected from the one or more antennas.

In some instances, the processors may further make the determination based on sensor data from at least one another sensor, such as an inertial measurement unit (IMU). Accordingly, the one or more processors may, for example, take into account both the determination based on the sensor data and the charge variation collected from the one or more antennas. Thereby, reliability of the determination may be increased.

The processors may operate the wearable device based on the detection. For instance, the processors may operate the earbud in a first mode based on detecting that the earbud is being worn. By way of example, the processors may route audio to be outputted by a speaker of the earbud, or control the earbud to enter an active mode from a standby mode. The processors may operate the earbud in a second mode based on detecting jaw motion of the user wearing the earbuds. For example, in the second mode the earbuds may prepare for receiving voice input from the user. The processors may operate the earbud in a third mode based on detecting that the earbud is not being worn. For example, the processors may route audio to be outputted by a speaker in another device, or control the earbud to enter the standby mode.

Example Systems

Figure 1B:
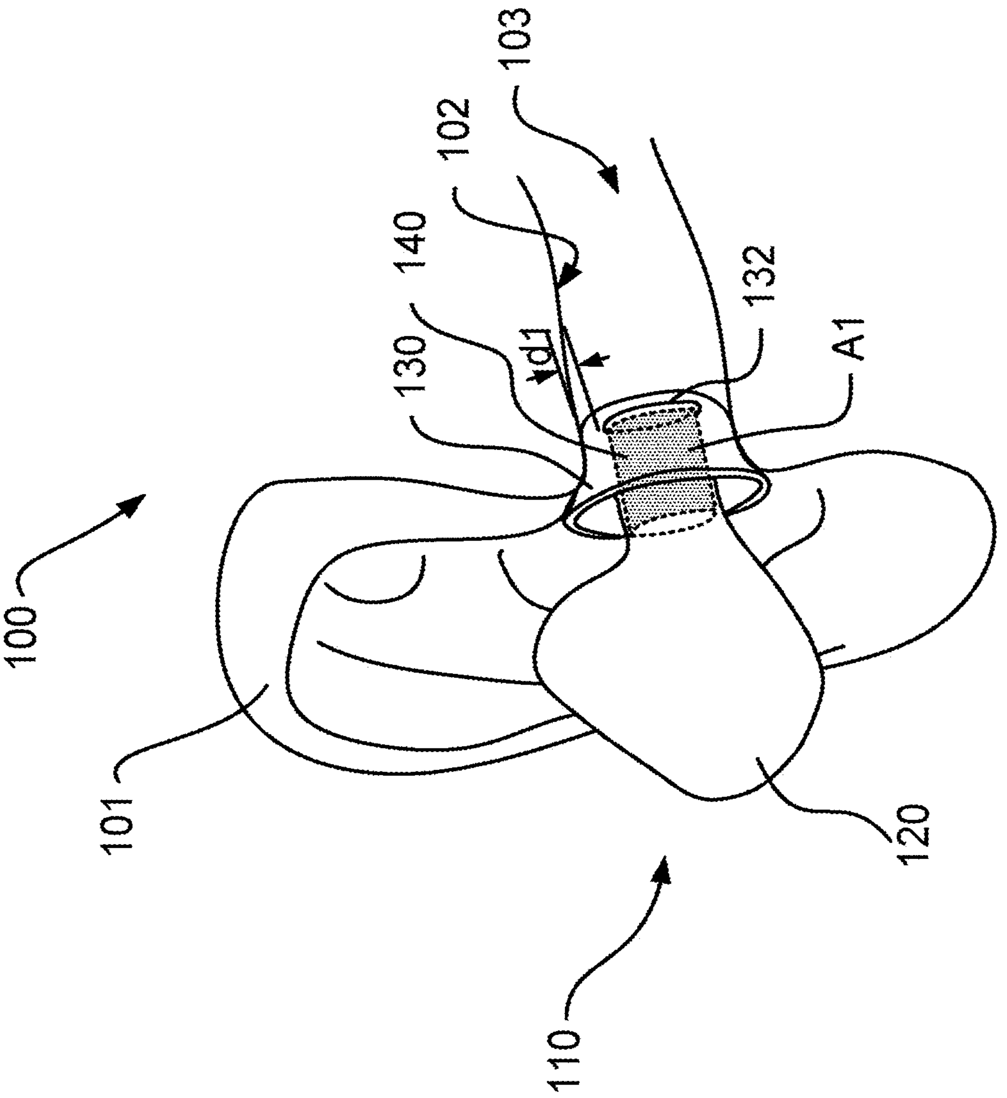

FIGS. 1A and 1B illustrate an example device, in particular, an earbud 110. FIG. 1A shows the earbud 110 in a position wherein it is not being worn inside a user's ear 101, and FIG. 1B shows the earbud 110 at a position wherein it is being worn inside ear 101. By way of example, when being worn inside ear 101, at least a portion of the earbud 110 may be surrounded by skin of the ear 101. The earbud 110 may be wireless in that it does not require a wired connection for use. For instance, the earbud 110 may receive signals wirelessly such as from a music player, phone, or other device to perform a number of functions, such as to generate output, to communicate with other devices, to be charged, etc. The earbud 110 may form a pair with another earbud. In some instances, the earbuds 110 may be truly wireless, where the pair of earbuds 110 are configured to connect to an audio source wirelessly, with no wire between the earbuds 110.

Referring to FIG. 1A, the earbud 110 may include a housing 120, which contains and supports various electronic and/or mechanical components of the earbud 110. The housing 120 may be made of any of a number of materials. For instance, the housing 120 may at least partially be made of a non-conductive material, such as plastic, ceramic, etc. In some instances, the housing 120 may at least partially be made of a non-permeable material that protects components inside the housing 120 from contaminants in the environment.

The earbud 110 may include physical features that allow the earbud 110 to securely and comfortably fit in the ear 101. For example as shown in FIG. 1A, the earbud 110 may include a cap 130 attached to the housing 120. For example, the cap 130 may be attached to one end of the housing 120. In some instances, the cap 130 may have at least one opening 132 such that sound from inside the earbud 110 may travel through the opening 132 to reach outside of the earbud 110. The cap 130 may be made of any of a number of materials. For instance, the cap 130 may at least partially be made of a flexible, non-conductive material, for example, a polymeric material such as rubber or silicone. The cap 130 may be configured to provide a snug fit for the portion of the earbud 110 inserted into the ear 101, such as by changing shape. Flexibility and dimensions of the cap 130 may further accommodate differences in ear anatomy and personal preferences on how to wear the earbud 110. In some instances, the cap 130 may also be configured to provide sound occlusion with respect to sounds originating outside of the earbud 110.

The earbud 110 may further include physical features that provide additional mechanical support. For example and as shown in FIG. 1A, the earbud 110 may further include a support 140 attached to the housing 120. The support 140 may be attached to one end of the housing 120, such as on the same end as the cap 130. The cap 130 may additionally or alternatively be attached to the support 140. In some examples, at least part of the support 140 may be attached to an inside surface of the housing 120 or embedded in the housing 120. As also shown in FIG. 1A, the support 140 may be shaped like a snout of the earbud 110 and configured to fit inside an ear. For example, the support 140 may have a tubular shape. In some instances, the support 140 may be configured as a sound port for the earbud 110 such that sound from inside the earbud 110 may travel through one or more openings in the support 140 to reach outside of the earbud 110. The support 140 may be made of any of a number of materials. For instance, the support 140 may at least partially be made of a conductive material, such as a metal or an alloy.

According to some examples, the support 140 may function as an antenna. As such, the support 140 may collect charge from a human body when the earbud 110 is worn by a user. Triboelectric series of materials show different charge characteristics. Motion of the human body motion will induce the body's charge variation, which can be detected by using an antenna such as the support 140. According to some examples, described in further detail below, the antenna may be connected to a charge amplifier. The signal can be processed by analog to digital converter (ADC) and digital filters to provide a detectable output signal when the device is in ear and jaw bone/muscle are moving.

Referring to FIG. 1B, when the earbud 110 is being worn by the user, the cap 130 and the support 140 may be partially or fully inserted into the ear 101. For instance, the cap 130 may be in direct contact with a skin surface 102 inside the ear 101, such as a skin surface that is part of the ear canal 103. When inserted into the ear 101, the flexible material of the cap 130 may change its shape to provide a secure and comfortable fit.

As shown in FIG. 1B, while being worn, an outside surface of the support 140 may be positioned at a distance d1 from the skin surface 102 inside the ear 101. The distance d1 may vary, for example within a range, depending on how the earbud 110 is being worn, the flexibility of cap 130, the user's anatomy, and the user's preferences when wearing the earbud (e.g., how far the user prefers to insert the earbud into ear). However, the range may be relatively small because the cap 130 is configured to ensure a consistent fit despite differences in anatomy and preference. By way of example, the cap 130 may be configured with dimensions and flexibility that allows it to change shape within a predetermined range. For instance, the predetermined range may be set between a predetermined diameter for a relatively narrow ear canal and a predetermined diameter for a relatively wide ear canal. Further, the cap 130 may be configured to require a minimum level of compressive force against the ear canal to provide a secure fit. As such, to achieve the minimum level of compressive force, a user with a wider ear canal may want to push the earbud 110 further inside the ear than a user with a narrower ear canal. As such, the range for d1 may be relatively small.

Still further, due to the tubular shape of the support 140 that roughly corresponds to the tubular shape of the ear canal 103, the support 140 may have a relatively large surface area A1 that is about a distance d1 from the skin surface 102 inside the ear 101.

Figure 2A:
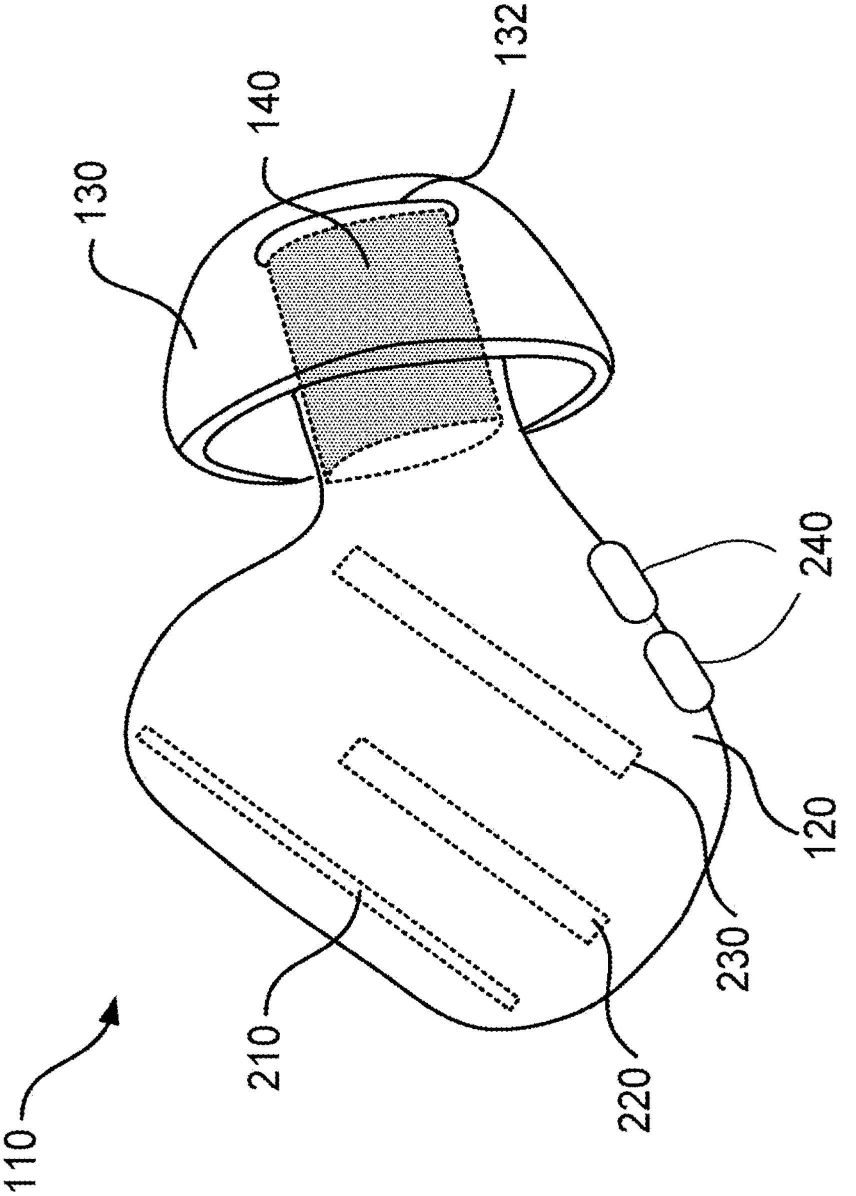
FIGS. 2A-2C are a pictorial diagrams illustrating components in example earbuds in accordance with aspects of the disclosure.

FIG. 2A illustrates some example components of the earbud 110. As shown, various components may be housed inside the housing 120. For example, a circuit board 210, such as a printed circuit board ("PCB") may be provided in the housing 120. The circuit board 210 may provide grounding for other components of the earbud 110. The circuit board 210 may include any of a number of circuits configured to perform any of a number of functions, such as processing information, generating audio, communicating, charging, etc. As another example, a battery 220 may be provided in the housing 120. For instance, the battery 220 may be charged, store energy, and provide energy to other components of the earbud 110.

A speaker 230 may be provided in the housing 120. The speaker 230 may include various components, such as metallic frame, metallic yoke, magnets, coils, amplifiers, diaphragms, and other circuit elements configured to receive analog and/or digital audio signals, and convert these audio signals into sound waves that can be perceived by the ear. For example, the speaker 230 may receive the audio signals from processors of the earbud 110, or from a paired device. In some examples, received audio signals may be processed by circuit elements in the speaker 230 and the circuit board 210, such as by filters, amplifiers, etc. The speaker 230 may be used to play music, emit audio for multimedia files, for voice calls, for translated speech, etc.

As mentioned above, the support 140 may be shaped like a snout and function as an antenna. The support 140 may be made of one or more metals typically used in antennas, or may be covered by such materials.

According to some examples, the earbud 110 may further include one or more charging pad electrodes 240. The charging pad electrodes may be electronically coupled to the battery 220, such that power received through the charging pad electrodes 240 may be delivered to the battery 220 to recharge the battery 220 and thereby power the device. For example, the charging pad electrodes 240 may contact corresponding elements within a charging case for the earbud 110 or on another wireless power delivery device. In this regard, power received wirelessly through the charging pad electrodes 240 from the charging case may be delivered to the battery 220 to replenish the battery 220.

The charging pad electrodes 240 may also function as an antenna and be used to detect in-ear status and jaw motion. The charging pad electrodes 240 may be coupled to signal processing circuitry, such as an amplifier, ADC, and filters. The circuitry is described in further detail in connection with FIGS. 3 and 6A-6B.

While the charging pad electrodes 240 are described as operating as an antenna in this example, in other examples any electrodes inside or outside the device may operate as an antenna for detecting in-ear status and jaw motion.

Figure 2B:
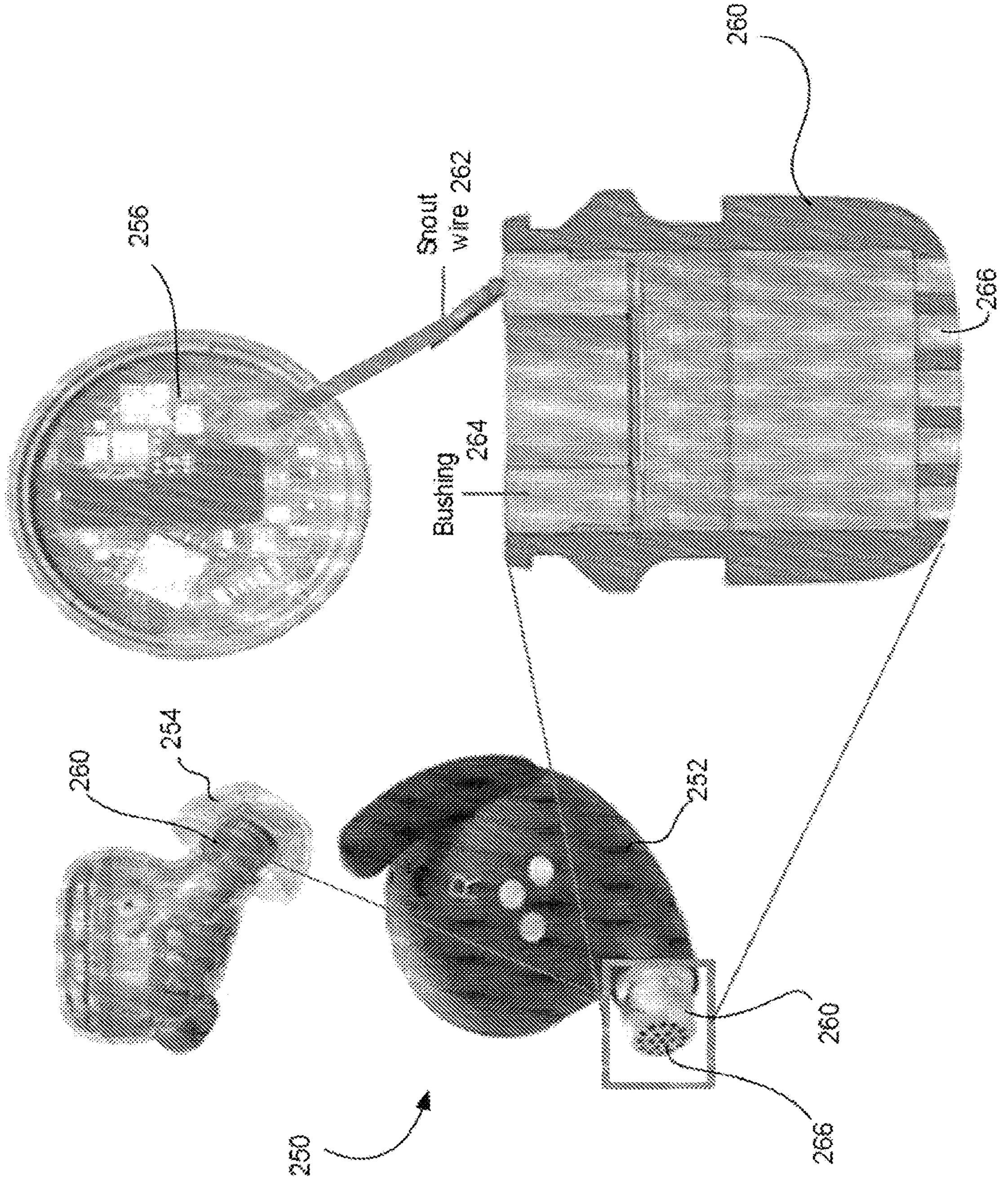

FIG. 2B provides a detailed view of another example earbud 250 including a metal snout 260 that functions as an antenna according to the present disclosure. The metal snout 260 is positioned at an output portion of the earbud 250 and may be sized and shaped to fit within the user's ear. For example, the metal snout 260 may be generally cylindrical and extend from an end portion of a housing 252. In some examples, the metal snout 260 may be structured similar to the support 140 of FIGS. 1A-B. Further, the metal snout 260 may be surrounded by a cap 254, similar to the cap 130 discussed above in connection with FIGS. 1A-B, for comfortable insertion into the user's ear. According to some examples, the metal snout 260 may be attached to a housing 252 made of plastic or another material.

The metal snout 260 may include one or more holes 266 allowing for sound to be output from a speaker within the housing 252 through the holes 266. The metal snout may be coupled to a main logic board (MLB) 256 of the device, for example, via a snout wire 262. For example, the snout wire 262 may be coupled between the MLB 256 and a bushing 264.

The metal snout 260 may be used as an antenna, such as an electrostatic charge variation sensor antenna. As such, the metal snout 260 may collect charge data from, for example, user's skin. Such charge data may be used to determine a status of the earbud 250, such as in-ear vs. out-of-ear. Moreover, the charge data may be used to detect states of a user, such as if the user's jaw is moving or not.

Figure 2C:
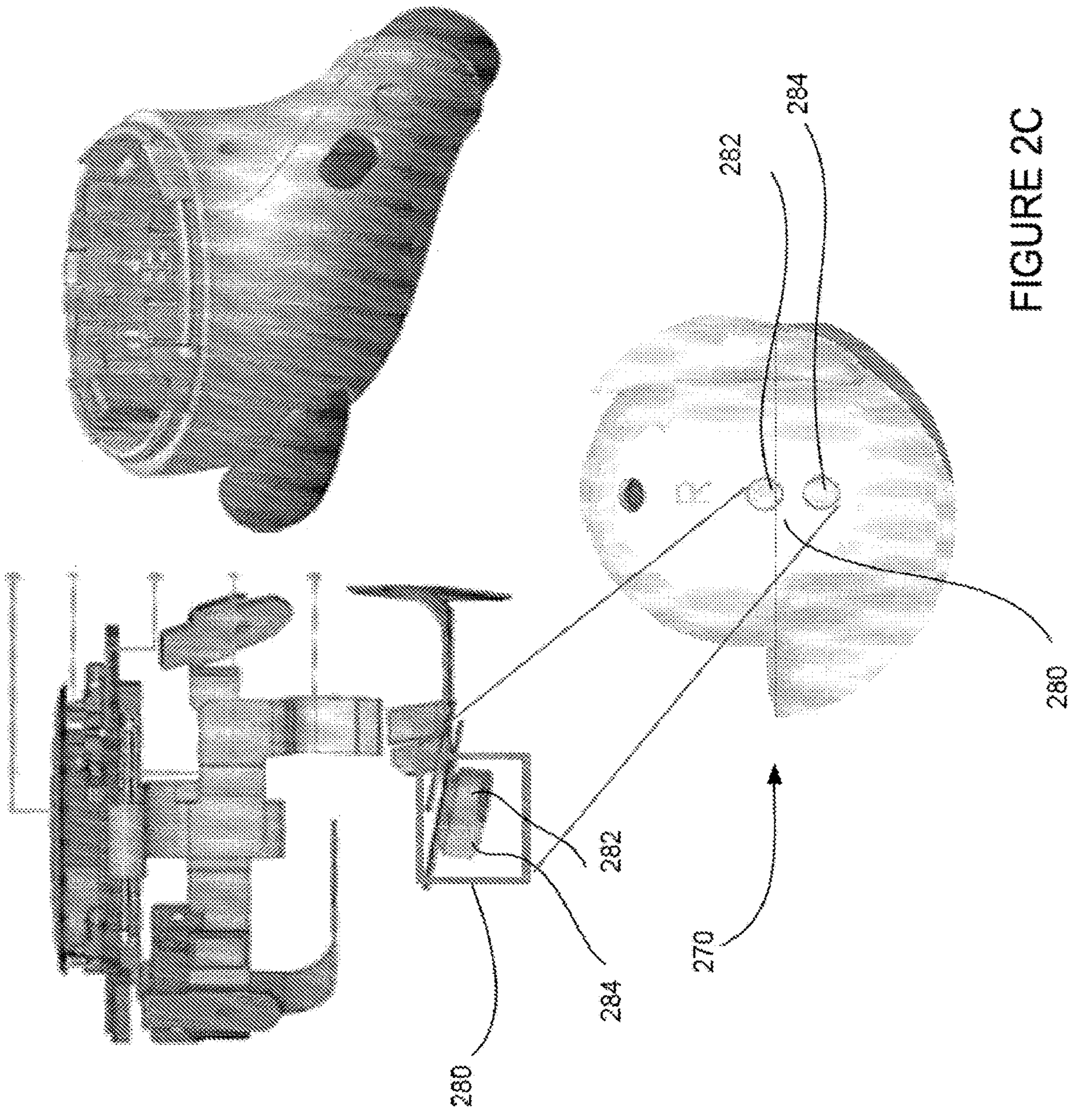

FIG. 2C illustrates details of another example earbud 270, including a charging pad 280 that functions as an antenna. As shown, the charging pad 280 may include one or more contacts 282, 284. While two contacts 282, 284 are shown, additional or fewer contacts may be included in other examples. Moreover, while the contacts 282, 284 are illustrated in this example as relatively small circles, a size and shape of the contacts may vary in other examples.

The charging pad contacts 282, 284 may be coupled to circuitry within a housing of the earbud 270. For example, in addition to being coupled to a battery and other electronics for charging and powering the earbud 270, the contacts 282, 284 may be coupled to circuitry for processing charge signal collected by the charging pad 280 when functioning as an antenna. In some earbuds, the charging pad 280 may carry approximately 5V and may have capacitors of approximately 1-10 uF. An AC capacitor may be placed on a VBUS line carrying the charging pad signal.

While the examples of FIGS. 1-2 illustrate earbuds, it should be understood that the wearable electronic device may be any of a variety of other wearable electronic devices, such as smartglasses, headsets, helmets, etc. The techniques described may further be applied to wearable devices worn on other parts of a body, such as rings, pendants, watches, etc.

Figure 3:
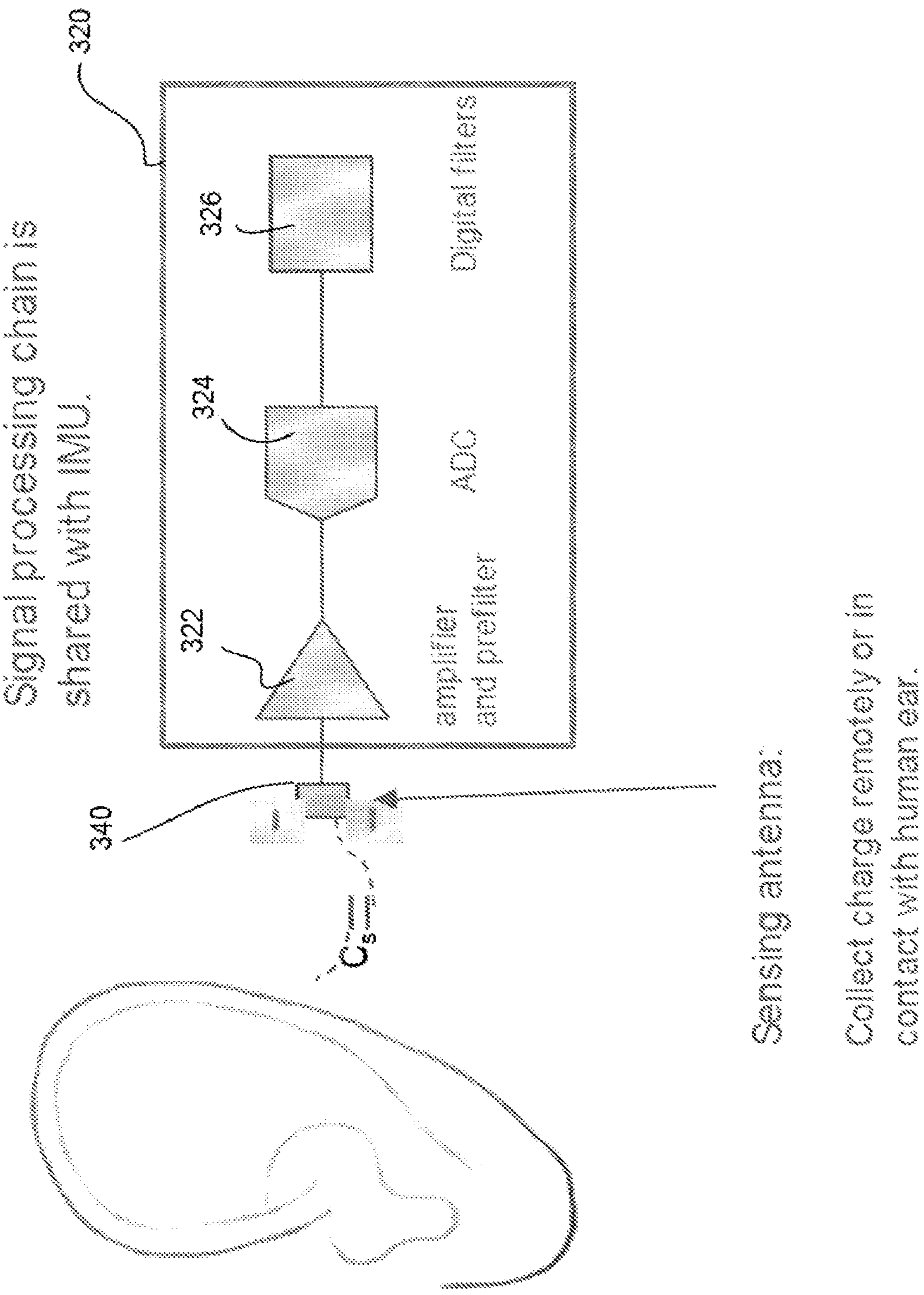
FIG. 3 is a circuit diagram illustrating an example signal processing chain according to aspects of the disclosure.

FIG. 3 illustrates an example of charge collection and signal processing. As shown, sensing antenna 340 of a wearable device collects a charge. The charge may be collected by the sensing antenna 340 whether the device is being worn by the user or whether the device is remote from the user. The sensing antenna 340 may be a snout antenna, charging pad antenna, and/or another antenna.

The charge collected by the sensing antenna 340 is processed by signal processing chain 320. The signal processing chain may include amplifier and prefilter 322 followed by ADC 324 and digital filter 326. The amplifier magnifies the signals collected by the sensing antenna 340 and the prefilter eliminates background noise. For example, the prefilter may be used to remove background electrostatic noise, such as a power line of 50 Hz and 60 Hz noise. The ADC 324 and digital filters 326 further process the signal to provide detectable output when the device is in ear and the jawbone is moving. For example, the ADC 324 may be used to convert the voltage or current induced by the static charge induction into the digital voltage or current. Digital filters 326 may be used to remove high frequency noise and provide a clean signal of jaw motion induced signal output.

Figure 4A:
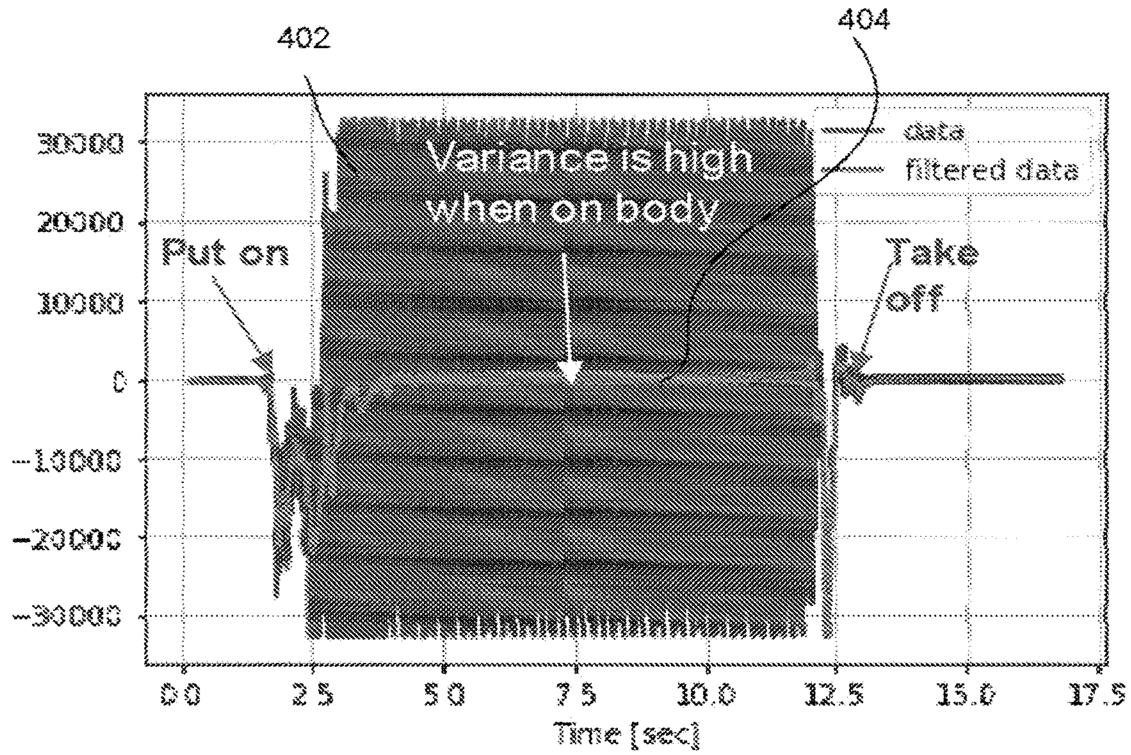
FIGS. 4A-4B are example output signals indicating charge variance detected according to aspects of the disclosure.

FIG. 4A illustrates an example output from the system of FIG. 3, the output indicating when the wearable device is worn by a user. In this example, data collected by the one or more antennas is represented by data signal 402, while filtered data output by the signal processing chain is represented by filtered data signal 404. Each of the data signal 402 and the filtered data signal 404 represent charge variance. As shown, the charge variance for both signals is approximately zero prior to the user putting on the device around the 2 s time and after the user takes off the device around the 13 s time. During a time the user puts the device on, between approximately the 2.0 s-2.5 s timeframe, both the data signal 402 and the filtered data signal 404 fluctuate significantly. When the device is being worn, between approximately the 2.5 s-12 s timeframe, the data signal 404 fluctuates even more significantly. During this time, charge variance is high, particularly when compared to other times. During this time when the device is worn, between approximately the 2.5 s-12 s timeframe, the filtered data signal 402 becomes relatively stable. When the device is taken off, between approximately the 12 s-13 s timeframe, both signals 402, 404 again fluctuate before the charge variance drops to zero.

Figure 4B:
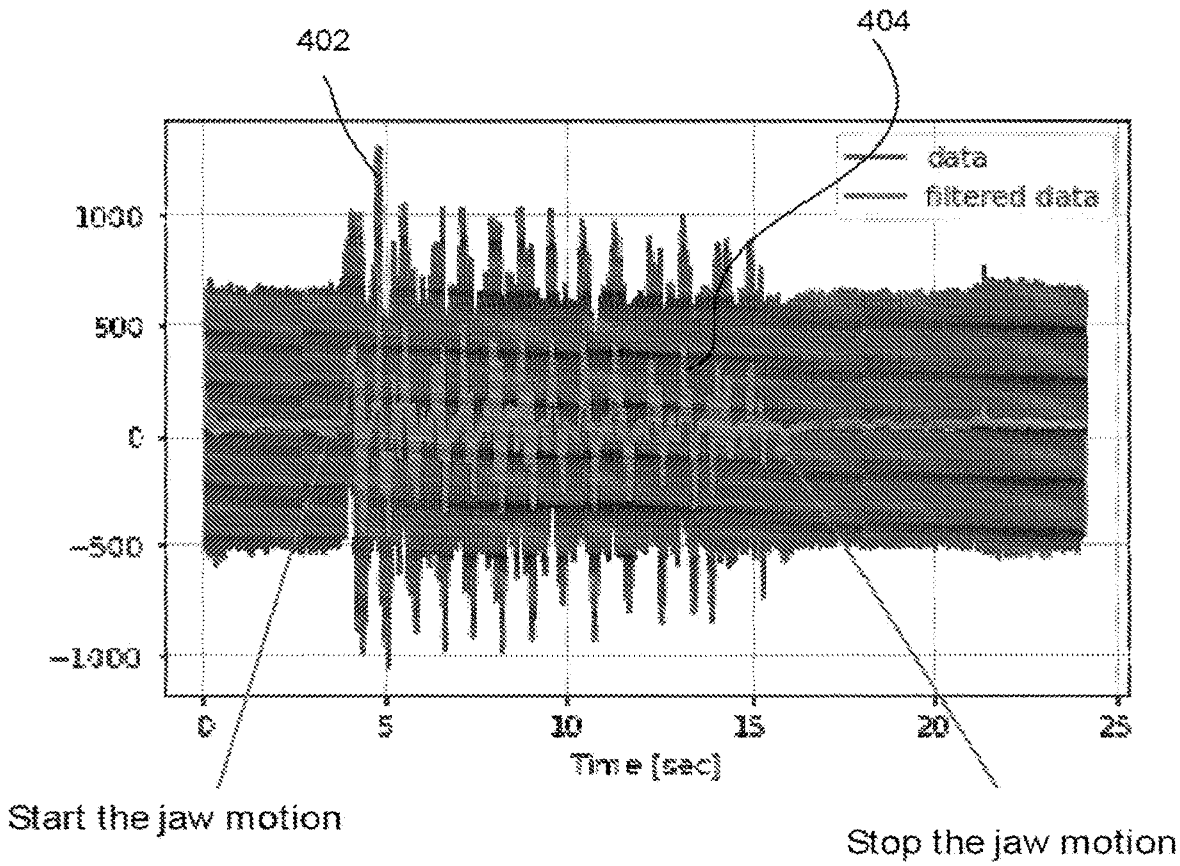

FIG. 4B illustrates another example output from the system of FIG. 3. In this example, the output indicates detection of jaw motion. Between 0 s and approximately 4 s, the charge variance is relatively high, indicated by the fluctuation in the data signal 402 and the relative stability of the filtered data signal 404. As discussed above in connection with FIG. 4B, this may indicate that the device is being worn by the user. During this time, the user is not talking and therefore the user's jaw is not moving.

Between approximately 4 s-16 s, the user's jaw is moving. As a result the data signal 402 representing the data collected from the one or more antennas fluctuates even more, indicating an increased charge variance as compared to a state where the device is worn, and the user's jaw is not moving. The filtered data signal 404 also fluctuates, though to a lesser degree than the data signal 402. As shown, peaks are generated in both the data signal 402 and the filtered data signal 404 while the user's jaw is moving. At approximately 16 s, when the user's jaw stops moving but the device is still being worn, the data signals 402, 404 again both stabilize.

Figure 5A:
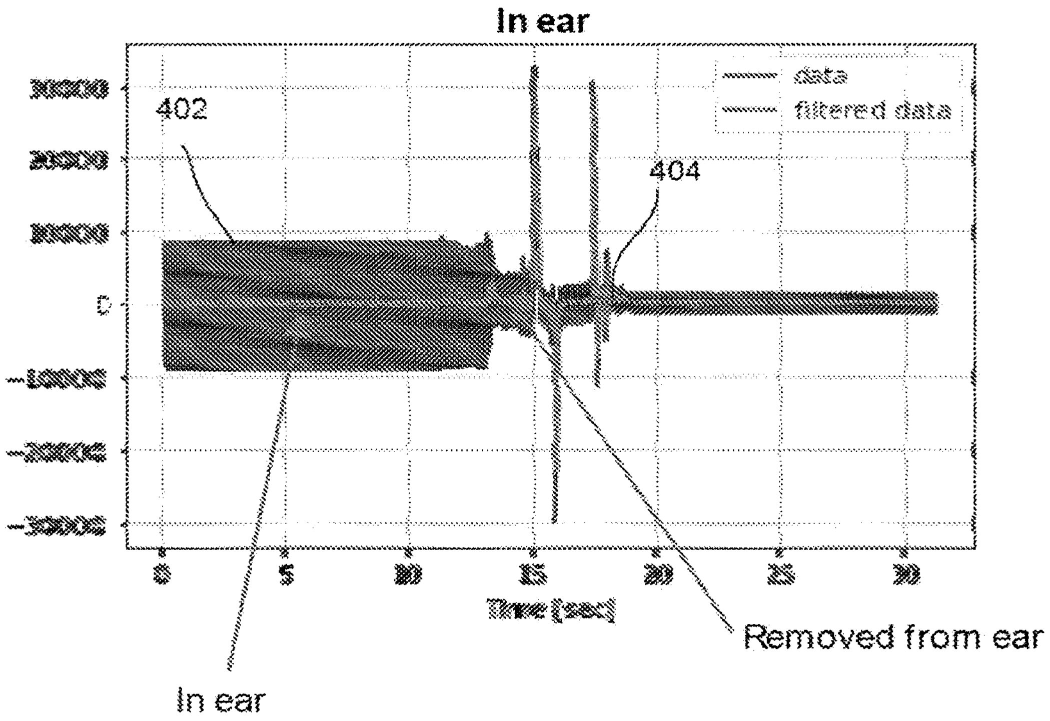
FIGS. 5A-5B are example output signals indicating charge variance detected according to aspects of the disclosure.
Figure 5B:
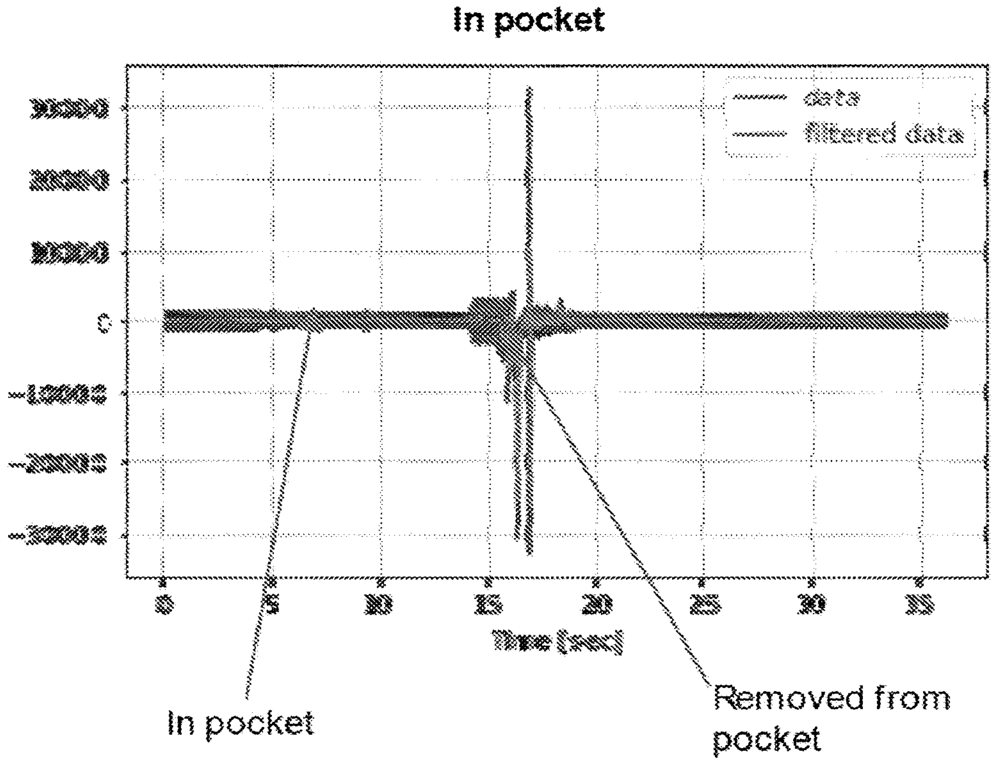

FIGS. 5A-B illustrates further example outputs from the system of FIG. 3. In FIG. 5A, the output shows a difference between a first state when the device is being worn by the user and a second state when the device is taken off the user. In this example, the device is an earbud. In the first state, between approximately 0 s-13 s, the device is being worn in the user's ear. At approximately 13 s, the device is removed from the user's ear and the charge variance correspondingly drops as indicated for example by the reduction in data signal 402. The large spikes in charge variance between approximately 15 s-18 s may be caused by, for example, handling of the earbud after it is taken out of the ear. For example, the user may hold the earbud in the user's fingers for a few seconds before the earbud is placed into the case, into a pocket, or elsewhere.

In FIG. 5B, the output shows a difference between a first state when the device is located in a user's pocket, and a second state when the device is taken out of the user's pocket. In the first state between approximately 0 s-14 s, the charge variance indicated by the data signal 402 is relatively low. Some charge variance may be detected based on, for example, the user's skin through the one or more layers of material between the user's pocket and the user's skin. The charge variance may differ based on, for example, which pocket the device is in, how tightly the user's clothing is worn, how close the user's pocket is to the user's skin, etc. The filtered data signal 404 is relatively stable while the device is in the user's pocket.

At approximately 15 s, the device is taken out of the user's pocket, causing fluctuation in both the data signal 402 and the filtered data signal 404. Such fluctuations may be caused by, for example, the user's fingers touching the device. As such, the one or more antennas on the device may detect increased charge variations while the device is being handled. After approximately the 18 s time, as shown in this example, the charge variance drops to a steady state for both the data signal 402 and the filtered data signal 404. This may correspond to the device being placed in a case, on a table, or elsewhere remote from the user's skin.

The difference between the in-pocket charge variation and the out-of-pocket charge variation may be caused by, for example, a difference in background noise. For example, the charge variance in pocket may be approximately 50, while the charge variance out of the pocket is closer to zero.

Figure 6A:
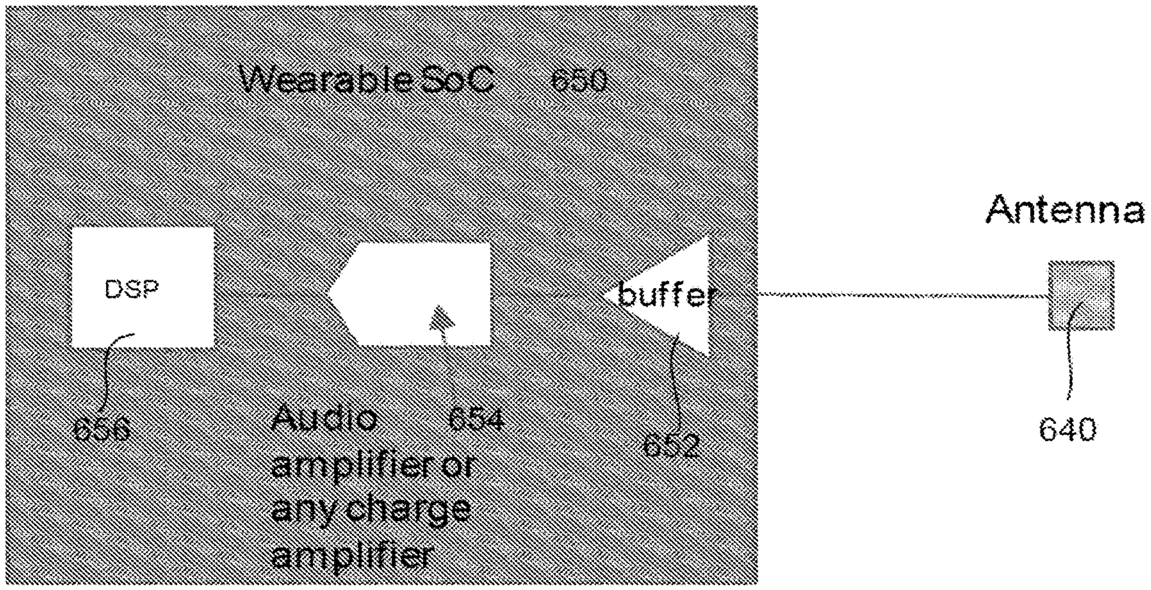
FIGS. 6A-6B are circuit diagrams illustrating example processing circuits in accordance with aspects of the disclosure.
Figure 6B:
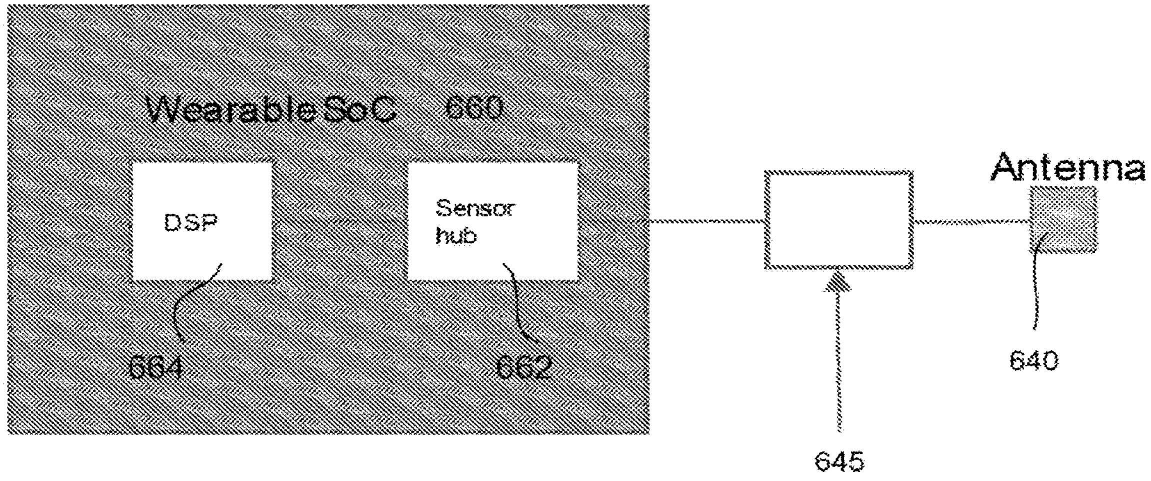

FIGS. 6A-B illustrate examples of the circuitry for detecting charge variance using the one or more antennas of the wearable device. In each example, a wearable system on chip (SoC) is used for processing the signals received by the one or more antennas, represented in these examples by antenna 640.

In FIG. 6A, wearable SoC 650 includes a buffer 652, amplifier 654, and digital signal processor (DSP) 656. The buffer 652 may temporarily store data collected from the antenna 640. The amplifier 654 may be, for example, an audio amplifier or any charge amplifier. The amplifier 654 may increase a gain of signals collected by the antenna 640 and stored in the buffer 652. The DSP 656 may perform filtering and/or other processing techniques to derive a processed signal.

In FIG. 6B, an individual static charge variation processing chip 645 is positioned between the antenna 640 and the SoC 660. The chip 645 may be, for example, an inertial measurement unit (IMU), pressure sensor, microphone with charge variation sensing input, or any of a variety of other types of chips. In this example, the chip 645 is used to convert the static charge variation signal into the digital output. The chip may include the analog front end to convert the static charge variation from antenna to voltage or current, and ADC to convert the analog signal to digital signal, and digital filters to remove noise.

The wearable SoC 660 in this example includes a sensor hub 662 and a DSP 664. The sensor hub 662 may be a microprocessor that can be used to collect data from different sensors and process the data. For example, the sensor hub 662 may collect sensor data from the antenna 640 and/or any of a variety of other sensors (not shown), such as an IMU, capacitive sensor, optical sensor, heat sensor, proximity sensor, etc. The DSP 664, similar to the DSP 656 of FIG. 6A, may perform filtering and/or other processing techniques on the signals received from the sensor hub 662.

In each example, the processed signal from the DSP may be analyzed to identify which state the device is in based on the signal. Such analysis may be performed, for example, by the DSP or by a separate processing unit coupled with the DSP. Such analysis may determine, for example, whether the device is being worn such as in-ear, in a pocket, on a table, being charged in a case, etc. For example, such determination may be made based on the charge variance detected by the antenna 640. In some examples, additional information from other sensors may also be factored into the analysis. For example, information from accelerometers, microphones, or other devices may be used in combination with the detected charge variance to obtain an accurate state detection.

Figure 7:
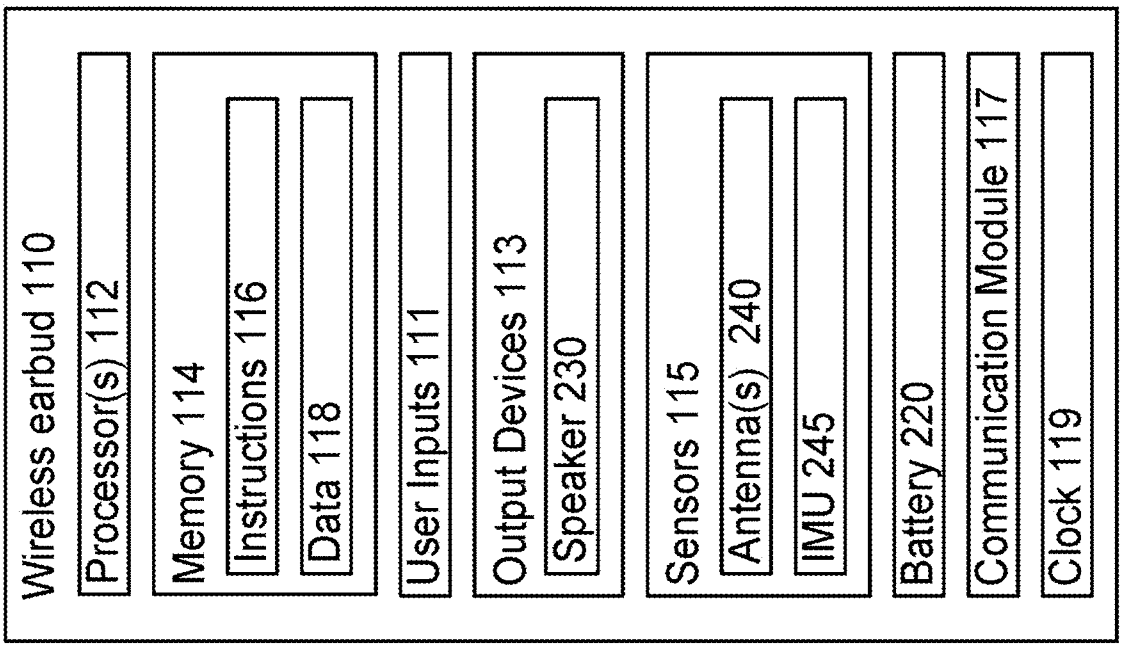
FIG. 7 is a block diagram of example earbud in accordance with aspects of the disclosure.

FIG. 7 is a functional block diagram of the example earbud 110, in which the features described herein may be implemented. It should not be considered as limiting the scope of the disclosure or usefulness of the features described herein. While one earbud 110 is shown, it should be understood that the earbud 110 may be one of a pair of earbuds, in which the earbud 110 operates in coordination with the other earbud. Each earbud in the pair may have similar structure to one another.

As shown, the earbud 110 may contain one or more processors 112, memory 114 and other components typically present in general purpose computing devices. For example, the earbud 110 may contain battery 220, speaker 230, clock 119, etc.

Memory 114 can store information accessible by the one or more processors 112, including instructions 116, that can be executed by the one or more processors 112. Memory 114 can also include data 118 that can be retrieved, manipulated, or stored by the processors 112. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, the earbuds 110 may include specialized hardware components to perform specific computing processes, such as decoding video, matching video frames with images, distorting videos, encoding distorted videos, etc. faster or more efficiently.

Although FIG. 7 functionally illustrates the processor, memory, and other elements of earbuds 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the earbud 110. Accordingly, references to a processor, computer, computing device, or memory will be understood to include references to a collection of processors, computers, computing devices, or memories that may or may not operate in parallel.

Further as shown in FIG. 7, earbud 110 may include one or more user inputs, such as user inputs 111 respectively. For instance, user inputs may include mechanical actuators, soft actuators, periphery devices, sensors, and/or other components. Examples of sensors in inputs 111 may include vibration sensors, such as microphones, touch sensors, such as capacitive or optical sensors, etc. For example, users may be able to control various audio characteristics using the user inputs 111, such as turning audio on and off, adjusting volume, etc.

Earbuds 110 may include one or more outputs devices, such as output devices 113. For instance, output devices may include one or more speakers 230, transducers or other audio outputs, a user display, a haptic interface or other tactile feedback that provides non-visual and non-audible information to the user. For example, speakers in output device 113 may be used to play music, emit audio for navigational or other guidance, for multimedia files, for voice calls, for translated speech, etc.

Earbud 110 may include one or more sensors, such as sensors 115. For instance, sensors 115 may include one or more antennas 240. Other examples of sensors may further include an IMU 245, a barometer, a vibration sensor, a heat sensor, a radio frequency (RF) sensor, a magnetometer, a barometric pressure sensor, an optical sensor, a capacitive sensor, or any of a variety of other types of sensors.

To obtain information from and send information to other earbuds, host devices, or other remote devices, earbud 110 may include a communication module, such as communication module 117. The communication module may enable wireless network connections, wireless ad hoc connections, and/or wired connections. Via the communication module 117, the earbud 110 may establish communication links, such as wireless links. The communication module 117 may be configured to support communication via cellular, LTE, 5G, 4G, WiFi, GPS, and other networked architectures. The communication module 117 may be configured to support Bluetooth®, Bluetooth LE, near field communications, and non-networked wireless arrangements. The communication module 117 may support wired connections such as a USB, micro USB, USB type C or other connector, for example to receive data and/or power from a laptop, tablet, smartphone or other device.

The earbud 110 may each include one or more internal clocks 119. The internal clocks may provide timing information, which can be used for time measurement for apps and other programs run by the computing devices, and basic operations by the computing devices, sensors, inputs/outputs, GPS, communication system, etc.

The one or more processors 112 may execute instructions 116 to collect charge via the one or more antennas 240 and to determine, based on the collected charge whether the earbud is being worn and/or whether the user is talking, for example by detecting whether the user's jaw is moving. Further methods performed by the one or more processors 112 are described in additional detail below.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 8:
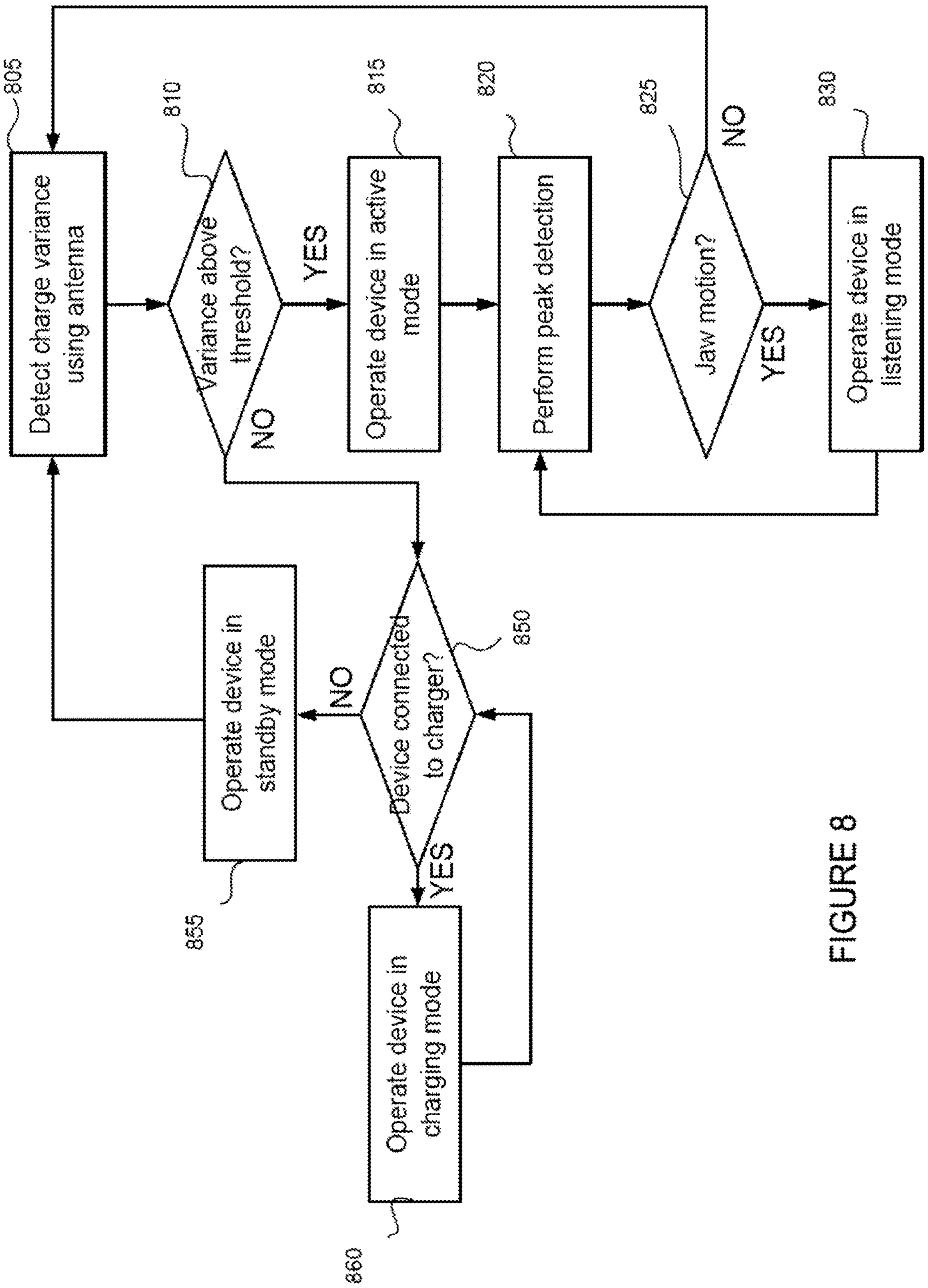
FIG. 8 is example flow diagram in accordance with aspects of the disclosure.

FIG. 8 shows an example flow diagram that may be performed by one or more processors of a wearable device, such as the one or more processors 112 of the earbud 110 of FIG. 7. For example, processors 112 may receive data and make various determinations as shown in the flow diagram. According to some examples, the wearable device may be an earbud, though in other examples the wearable device may be smartglasses, a head mounted display, a headset, a helmet, or any other type of wearable electronic device worn on a user's head or other parts of the user's body.

Referring to FIG. 8, in block 805, charge variance is detected using one or more antennas of the wearable device. For example, the one or more antennas may include a metal snout of an earbud, a charging pad contact, or any other metal element of the wearable device that may come within proximity of the user's skin when the device is worn. Detecting charge variance may include collecting charge variance data using the antenna. In some examples, detecting charge variance may further include processing the collected charge variance data, such as by amplifying the data, filtering the data, and/or performing digital signal processing or other processing techniques.

In block 810, it is determined whether the charge variance is above a predetermined threshold. For example, the predetermined threshold may be set based on a charge variance level known to be associated with wearing of the electronic device. According to some examples, the predetermined threshold may be set during a manufacturing process. According to other examples, the predetermined threshold may be calibrated based on charge levels specific to the user's skin. For example, a user can perform a setup process during which the user puts on the wearable device and confirms the device is being worn. As such, detected charge variance levels during that setup process may be used to select a predetermined threshold or to adjust the threshold set during manufacture.

If the charge variance detected using the antenna exceeds the predetermined threshold, it may be determined that the device is being worn by a user. For example, where the device is an earbud, it may be determined that the device is worn within the user's ear. As such, in block 815, the device may operate in an active mode. In the active mode, the device may deliver content to the user through an output of the wearable device. For example, the device may output music, voice calls, notifications, or other audio content through a speaker of the wearable device. In other examples where the device includes a display, the device may output visual content through the display when in the active mode. In further examples, the device may output notifications using haptic feedback, such as vibrations, pulses, etc.

When in the active mode, the device may further perform a peak detection process (block 820). In this process, the device may analyze charge variance signals to determine whether peaks are generated. For example, detection of peaks may signify that the user's jaw is moving. In block 825, it is determined based on the peak detection whether the user's jaw is moving. For example, it may be determined whether the peaks have an amplitude and/or frequency that is consistent with jaw motion of the user. By way of example, one or more jaw motion detection thresholds may be set such that when peaks of a threshold amplitude, frequency, and/or number are detected, the user's jaw is determined to be moving. As another example, a memory of the device may store a signal profile corresponding to jaw movement, and the detected peaks may be compared to the stored signal profile to determine whether the compared signals match closely enough, in which case it may be determined that the user's jaw is moving.

If it is determined in block 825 that the user's jaw is moving, the device may transition to operate in a listening mode in block 830. In the listening mode, the device may activate a microphone to receive voice input, perform audio noise cancellation, and/or perform any of a number of other processes that relate to a user talking. If it is determined in block 825 that the user's jaw is not moving, the device may continue to operate in the active mode until jaw motion is detected or until the detected charge variance drops below the predetermined threshold.

If it is determined in block 810 that the detected charge variance does not exceed the predetermined threshold, it may be determined in block 850 whether the device is connected to a charger. For example, where the device is a pair of earbuds, it may be detected whether the devices are stored within a corresponding charging case. In other examples, it may be determined whether wireless charging contacts of the device are electrically connected with wireless charging contacts of a wireless charger. In further examples, it may be determined whether a charging cable is inserted into a charging port of the device.

If the device is not connected to a charger, the device may operate in a standby mode in block 855. The standby mode may be a low power or ultra-low power mode, in which the device deactivates a number of functions and/or processes to conserve power as the device is not being worn by the user. Such functions deactivated in the standby mode may include, for example, receipt of packets from a host device, output of content, listening for input, etc. According to some examples, the device may continue to detect charge variance using the antenna when in standby mode. In further examples, the device may detect the charge frequency only periodically, such as once per second, once every few seconds, etc.

If the device is determined to be connected to a charger in block 850, the device may operate in a charging mode in block 860. In the charging mode, the device may receive charge from the charging device and supply the charge to a battery within the wearable device. According to some examples, when operating in the charging mode, the device may switch functions performed by a charging pad on the device from antenna functions to charging functions. The charging pad may continue to function as a mechanism for delivering charge to the battery of the device until it is detected that the device is no longer connected to the charger. For example, when the device transitions to standby mode after it is disconnected from the charger, the charging pad may switch to operating as an antenna for detecting charge variance.

The technology is able to detect, with relatively high accuracy, whether a person is currently wearing a device on their body, such as an earbud in an ear. By using components on the device to serve as an antenna in addition to other functions, such as charging pad, metal snout, etc., an overall size and cost of the device may be reduced. By transitioning between modes based on readings detected by the components functioning as antennas, the device may save power and thereby extend battery life. For example, the device may enter a standby state, or otherwise decrease its power usage when it is not being worn. In addition, user experience may be improved by routing audio to the most appropriate device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for determining a state of a wearable electronic device using one or more metal components of the wearable electronic device as an antenna, the method comprising:

receiving, by the one or more metal components of the wearable electronic device, charge variation data;

determining, by one or more processors, whether the received charge variation data exceeds a predetermined threshold;

determining, by the one or more processors, that the wearable electronic device is being worn by a user when the received charge variation data exceeds the predetermined threshold;

detecting, with the one or more processors, peaks in the received charge variation data when the device is determined to be worn by the user;

determining, with the one or more processors based on the detected peaks, whether a jaw of the user is moving; and operating the wearable electronic device in an active mode when it is determined that the wearable electronic device is being worn by the user; or operating the wearable electronic device in a listening mode when it is determined that the jaw of the user is moving.

2. The method of claim 1, further comprising processing the received charge variation data, wherein the determining whether the received charge variation data exceeds the predetermined threshold comprises comparing the processed charge variation data to the predetermined threshold.

3. The method of claim 2, wherein the processing of the received charge variation data comprises at least one of amplifying the received charge variation data or filtering the received charge variation data.

4. The method of claim 1, wherein in the listening mode the wearable electronic device performs at least one of an audio noise cancellation or listening for a voice input from the user.

5. The method of claim 1, further comprising:

determining, with the one or more processors, whether the wearable electronic device is connected to a charger;

operating the wearable electronic device in a standby mode when the wearable electronic device is not connected to the charger, the standby mode being a low power mode; and operating the wearable electronic device in a charging mode when the wearable electronic device is connected to the charger, wherein in the charging mode the wearable electronic device receives a charge through a charging pad of the wearable electronic device.

6. The method of claim 5, wherein the charging pad functions as the antenna when the wearable electronic device is not connected to the charger.

7. A wearable electronic device, comprising:

a housing;

one or more metal components integrated with, housed by, or coupled to the housing, the one or more metal components configured to function as one or more antennas;

one or more processors in communication with the one or more metal components, the one or more processors configured to:

receive charge variation data from the one or more antennas;

determine whether the received charge variation data exceeds a predetermined threshold;

determine that the wearable electronic device is being worn by a user when the received charge variation data exceeds the predetermined threshold;

detect peaks in the received charge variation data when the device is determined to be worn by the user;

determine, based on the detected peaks, whether a jaw of the user is moving; and operate the wearable electronic device in an active mode when it is determined that the wearable electronic device is being worn by the user; or operating the wearable electronic device in a listening mode when it is determined that the jaw of the user is moving.

8. The wearable electronic device of claim 7, further comprising circuitry in communication with the one or more antennas, the circuitry configured for processing the received charge variation data.

9. The wearable electronic device of claim 8, wherein the circuitry comprises at least one of an amplifier, a filter, or a digital signal processor.

10. The wearable electronic device of claim 7, wherein in the listening mode the wearable electronic device performs at least one of an audio noise cancellation or a listening for voice input from the user.

11. The wearable electronic device of claim 7, wherein at least one of the metal components comprises a charging pad, and wherein the one or more processors are further configured to:

determine whether the wearable electronic device is connected to the charger;

operate the wearable electronic device in a standby mode when the wearable electronic device is not connected to the charger, the standby mode being a low power mode; and operate the wearable electronic device in a charging mode when the wearable electronic device is connected to the charger, wherein in the charging mode the wearable electronic device receives a charge through the charging pad of the wearable electronic device.

12. The wearable electronic device of claim 11, wherein the charging pad functions as the antenna when the wearable electronic device is not connected to the charger.

13. The wearable electronic device of claim 7, wherein the wearable electronic device is an earbud.

14. The wearable electronic device of claim 7, wherein the instructions further cause the one or more processors to:

determine whether the wearable electronic device is connected to a charger;

operate the wearable electronic device in a standby mode when the wearable electronic device is not connected to the charger, the standby mode being a low power mode; and operate the wearable electronic device in a charging mode when the wearable electronic device is connected to the charger, wherein in the charging mode the wearable electronic device receives a charge through a charging pad of the wearable electronic device.

15. A non-transitory computer-readable medium storing instructions executable by one or more processors for performing a method of determining a state of a wearable electronic device using one or more metal components of the wearable electronic device as an antenna, the method comprising:

receiving charge variation data;

determining whether the received charge variation data exceeds a predetermined threshold;

determining that the wearable electronic device is being worn by a user when the received charge variation data exceeds the predetermined threshold;

detect peaks in the received charge variation data when the device is determined to be worn by the user;

determine, based on the detected peaks, whether a jaw of the user is moving; and operating the wearable electronic device in an active mode when it is determined that the wearable electronic device is being worn by the user; or operating the wearable electronic device in a listening mode when it is determined that the jaw of the user is moving.

16. The non-transitory computer-readable medium of claim 15, further comprising circuitry in communication with the one or more antennas, the circuitry configured for processing the received charge variation data.

17. The non-transitory computer-readable medium of claim 15, wherein in the listening mode the wearable electronic device performs at least one of an audio noise cancellation or a listening for voice input from the user.

18. The non-transitory computer-readable medium of claim 15, wherein:

the instructions further cause the one or more processors to process the received charge variation data; and the determining whether the received charge variation data exceeds the predetermined threshold comprises comparing the processed charge variation data to the predetermined threshold.

19. The non-transitory computer-readable medium of claim 15, wherein the processing of the received charge variation data comprises at least one of:

amplifying the received charge variation data; or filtering the received charge variation data.

20. The non-transitory computer-readable medium of claim 15, wherein the instructions further cause the one or more processors to:

determine whether the wearable electronic device is connected to a charger;

operate the wearable electronic device in a standby mode when the wearable electronic device is not connected to the charger, the standby mode being a low power mode; and operate the wearable electronic device in a charging mode when the wearable electronic device is connected to the charger, wherein in the charging mode the wearable electronic device receives a charge through a charging pad of the wearable electronic device.

* * * * *